(12) United States Patent
Yokota (10) Patent No.: US 7,964,986 B2
(45) Date of Patent: Jun. 21, 2011

(54) DRIVE CONTROL APPARATUS, SYSTEM AND METHOD

(75) Inventor: Youji Yokota, Kariya (JP)

(73) Assignee: Denso Corporation, Kariya (JP)

( * ) Notice: Subject to any disclaimer, the term of this patent is extended or adjusted under 35 U.S.C. 154(b) by 1041 days.

(21) Appl. No.: 11/798,386

(22) Filed: May 14, 2007

(65) Prior Publication Data

US 2007/0279949 A1 Dec. 6, 2007

(30) Foreign Application Priority Data

May 16, 2006 (JP) ................. 2006-136361
Feb. 27, 2007 (JP) ................. 2007-047414

(51) Int. Cl.
*H02H 7/18* (2006.01)
(52) U.S. Cl. ..................................... 307/10.7
(58) Field of Classification Search .................. 307/10.7
See application file for complete search history.

(56) References Cited

U.S. PATENT DOCUMENTS

| | | | |
|---|---|---|---|
| 5,159,257 A | 10/1992 | Oka et al. | |
| 6,532,926 B1 | 3/2003 | Kuroda et al. | |
| 6,624,529 B2 * | 9/2003 | Obayashi | 290/40 C |
| 7,211,907 B2 * | 5/2007 | Kephart | 307/10.7 |
| 7,248,152 B2 * | 7/2007 | Gilbert et al. | 340/428 |
| 7,580,688 B2 * | 8/2009 | Jiang et al. | 455/127.1 |
| 2002/0157883 A1 | 10/2002 | Ogata et al. | |

FOREIGN PATENT DOCUMENTS

| | | |
|---|---|---|
| EP | 1 177 928 | 2/2002 |
| JP | 4-39155 | 4/1992 |
| JP | 4-48063 | 4/1992 |
| JP | 4-274944 | 9/1992 |
| JP | 2000-274272 | 10/2000 |
| JP | 2001-341596 | 12/2001 |
| JP | 2003-226208 | 8/2003 |
| JP | 2004-291720 | 10/2004 |
| JP | 2005-264901 | 9/2005 |

OTHER PUBLICATIONS

Extended European Search Report dated Oct. 8, 2008, issued in counterpart European Application No. 07009863.7-1254.

* cited by examiner

*Primary Examiner* — Jared J Fureman
*Assistant Examiner* — Hal I Kaplan
(74) *Attorney, Agent, or Firm* — Nixon & Vanderhye P.C.

(57) ABSTRACT

A drive control apparatus automatically stops a drive power source operation of a vehicle under a predetermined operation condition. When a predetermined time period lapses after the automatic stop operation of the drive power source under a condition that a key switch is still held operated, a power supply from a battery to the drive control apparatus is also automatically stopped. The predetermined time period is set to a time period that is supposed necessary until a driver or the like notices the stop of the drive power source and turns off the key switch. Thus, after the drive power source is forced to stop, the battery is protected from unnecessary power consumption by various devices in the vehicle.

21 Claims, 10 Drawing Sheets

DRIVE CONTROL APPARATUS, SYSTEM AND METHOD

CROSS REFERENCE TO RELATED APPLICATION

This application is based on and incorporates herein by reference Japanese Patent Applications No. 2006-136361 filed on May 16, 2006 and No. 2007-47414 filed on Feb. 27, 2007.

FIELD OF THE INVENTION

The present invention relates to a drive control apparatus, system and method, which control a drive force of a drive power source in a vehicle with power supply from a battery mounted on the vehicle.

BACKGROUND OF THE INVENTION

In recent years, various techniques for automatically stopping a drive power source of a vehicle upon the fulfillment of a shutdown condition are proposed and introduced from the viewpoint of environmental protection.

For example, when an operation time period of a brake pedal by a driver reaches a predetermined time period during an idling of an internal combustion engine, which is a drive power source of the vehicle, the engine is forcibly stopped (JP 2000-274272A). Further, when at least one condition is met among the conditions that a vehicle speed is lower than a predetermined value, that a shift position is neutral or parking, and that a side brake is operated, the engine of the vehicle is forcibly stopped. However, even if the engine is forcibly stopped as above, power supply from a battery to various parts of the vehicle might be continued even after the stop of the engine. This also occurs in a case where the engine is stopped due to any trouble.

In a state where the engine is thus stopped, the battery is not charged by an alternator that is driven by the engine. Therefore, the power supply to the various parts of the vehicle from the battery continues for a long time, with the result that the battery is consumed unnecessarily. The engine may fail to be started again because of insufficient power supply from the battery.

SUMMARY OF THE INVENTION

The present invention has an object to protect a battery in a vehicle from unnecessarily consuming electric power.

According to one aspect, a drive control apparatus for a drive power source of a vehicle receives a power supply from a battery mounted on the vehicle and controls the drive power source. The drive control apparatus detects that the drive power source is forcibly stopped under a predetermined shutdown condition, and stops the power supply from the battery under a predetermined power supply stop condition after detection of the stop of the drive power source.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
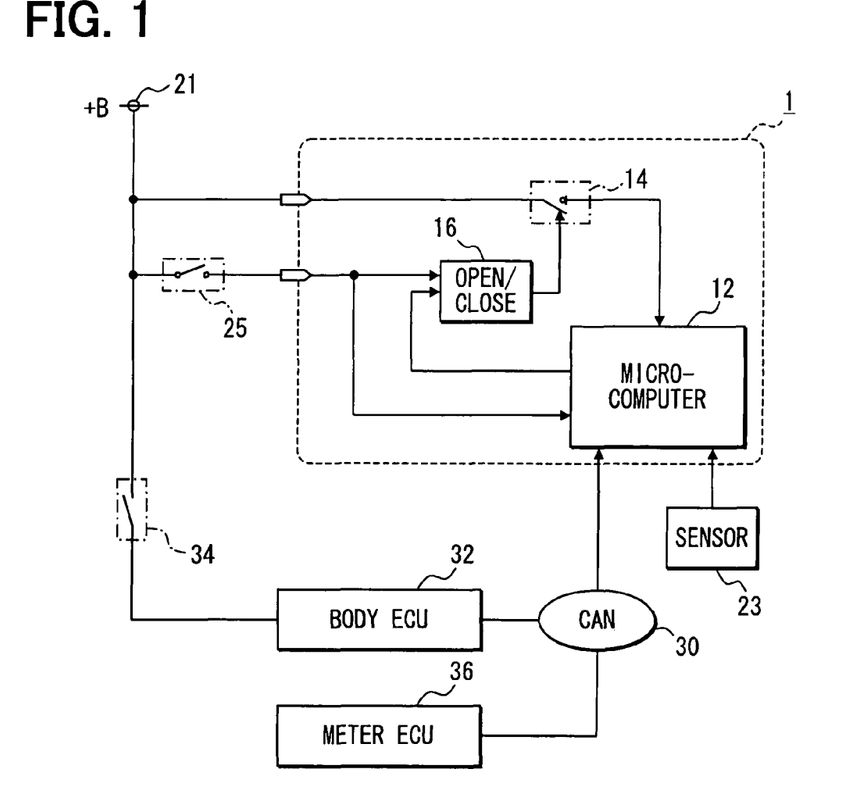
FIG. 1 is a block diagram showing a vehicle control system using a drive control apparatus according to the present invention.

Referring first to FIG. 1, a drive control apparatus 1 is an electronic control apparatus (ECU), which receives power supply from a battery 21 mounted on a vehicle to control operations of predetermined parts in the vehicle. For example, the drive control apparatus 1 controls a drive power source (not shown) such as an internal combustion engine or an electric motor in the vehicle, thereby to control the drive force for the vehicle.

The drive control apparatus 1 includes a microcomputer 12 that controls the operation of the drive control apparatus 1, a power supply switch 14 which is arranged in a supply line of a supply voltage from the battery 21 to the microcomputer 12, and an opening/closing command circuit 16 that receives a command from the microcomputer 12 to control the opening/closure of the supply line based on the power supply switch 14.

The microcomputer 12 executes various processes, in accordance with programs stored in a built-in memory, based on input signals from various sensors 23, signals inputted via a CAN network 30, and signals inputted from a key switch 25.

Here, the sensors 23 include a drive power source sensor for detecting a revolution number of the drive power source, a pedal sensor for detecting an operation amount of a brake pedal or an accelerator pedal, a shift position sensor for detecting a changeover state (shift position) of a transmission, a vehicle speed sensor for detecting a traveling speed of the vehicle, and so forth. These sensor signals may well be inputted via the network 30.

The signals inputted via the network 30 include, for example, a signal transmitted from a body ECU 32 that monitors a state concerning a vehicle body in the vehicle. The body ECU 32 monitors, for example, an output signal from a door switch 34 that detects the opening/closing operation of a door. In this embodiment, only the door on a driver seat side is shown. The output signal has its signal level changed to the level (H level) of the supply voltage signal based on the battery 21, when the door in the vehicle is opened to changeover the door switch 34 onto an ON side. In addition, the body ECU 32 transmits the open/closed state of the door as is indicated by the output signal from the door switch 34 to the microcomputer 12 through the network 30.

The other information items which are inputted via the network 30 include signals, which indicate the operation states of controlled variables transmitted from the other ECUs, such as a meter ECU 36 for performing the control of displaying the various states of the vehicle on a display device, a navigation ECU for controlling a navigation apparatus, an audio ECU for controlling audio equipment mounted on the vehicle, and an air-conditioner ECU for controlling an air-conditioner mounted on the vehicle.

Figure 2:
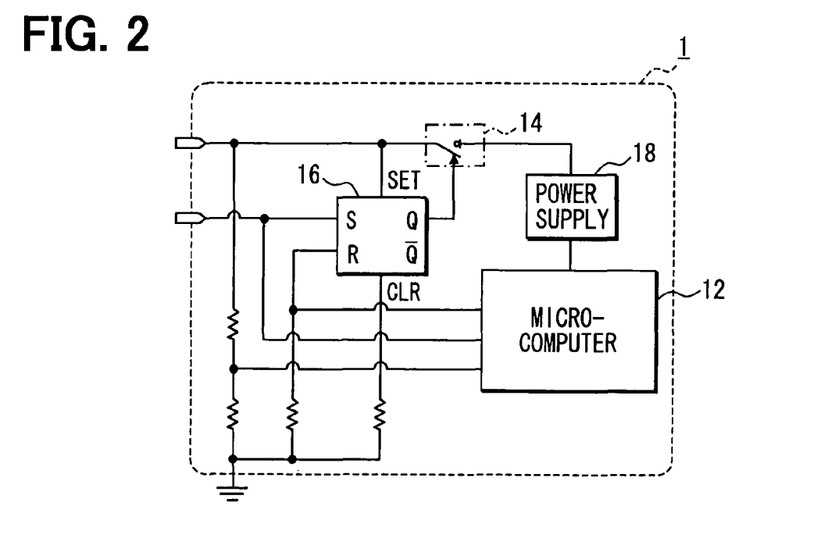
FIG. 2 is a circuit diagram showing the drive control apparatus shown in FIG. 1.

More specifically, as shown in FIG. 2, the opening/closing command circuit 16 is a latch circuit. A power supply circuit (regulator and power supply IC) 18 is provided between the power supply switch 14 and the microcomputer 12 to stably feed the supply voltage to the microcomputer 12.

Figure 3:
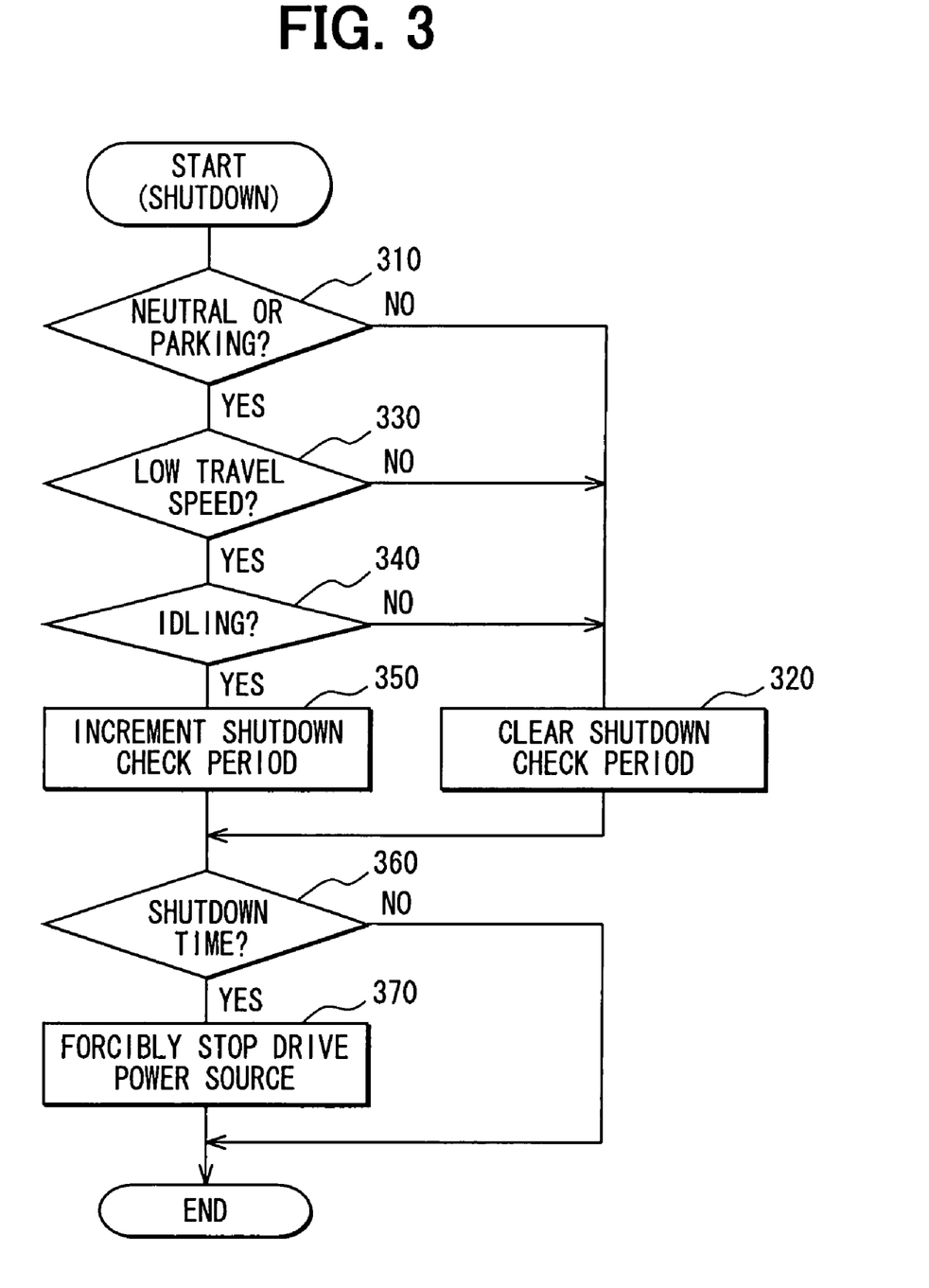
FIG. 3 is a flow chart showing a shutdown process executed in the drive control apparatus of FIG. 2.

The microcomputer 12 executes various processing steps including a shutdown process, which is repeatedly executed every fixed time period (for example, one second) after the operation start of the microcomputer 12. One example of this process is stored in a memory of the microcomputer 12 as shown in FIG. 3.

When the shutdown process is started, whether or not a shift position (the gear state of the transmission) is neutral or parking is first checked (step 310). This check may be made based on a result detected by the shift position sensor.

When the shift position is not neutral or parking (step 310: NO), a shutdown check time period is cleared (step 320), and the process thereafter proceeds to the next step (step 360). The shutdown check time period is a variable provided for counting the duration time of a state where YES is determined at both steps 310, 330 and 340 as will be described below. In addition, 0 is set as an initial value of the shutdown check time period at step 320.

When it is determined at step 310 that the shift position is neutral or parking (step 310: YES), whether or not the traveling speed of the vehicle is, at most, a predetermined low travel speed (for example, 10 km/h) is checked (step 330). The determination here is made based on a result detected by the vehicle speed sensor.

When the traveling speed of the vehicle is higher than the predetermined speed (step 330: NO), the process proceeds to step 320, at which the shutdown check time period is cleared.

When the traveling speed of the vehicle is, at most, the predetermined speed (step 330: YES), whether or not the operating state of the drive power source is an idle state (a state where the drive power source is stable at a fixed revolution number or below) is checked (step 340).

Here, the determination is made by referring to the value of an idle flag for which 1 is set only while the drive control apparatus 1 is performing a process for bringing the operating state of the drive power source into the idle state in the course of controlling this drive power source. In the case where the drive power source is the engine, the idle state may well be determined on the ground that a result detected by the drive power source sensor is a revolution number on the occasion of the idle state.

When the operating state of the drive power source is not in the idle state (step 340: NO), the process proceeds to step 320, at which the shutdown check time period is cleared.

When the operating state of the drive power source is in the idle state (step 340: YES), the shutdown check time period is incremented by adding 1 to the time period (step 350).

Subsequently, whether or not a value set in the shutdown check time period reached a predetermined threshold value (for example, 7200), that is, whether it is a shutdown time is checked (step 360).

When the value set in the shutdown check time period reaches the predetermined threshold value at step 360 (step 360: YES), the a shutdown condition is satisfied. Then, processing for forcibly stopping the drive power source is performed (step 370). Here, in the case where the drive power source is the engine, the processing for forcibly stopping the engine is performed by stopping the feed of fuel to the engine. In the case where the drive power source is the motor, the processing for forcibly stopping the motor is performed by stopping electric power supply to the motor.

On the other hand, when the value set in the shutdown check time period is less than the predetermined threshold value (step 360: NO), the shutdown process at step 370 is not performed.

The microcomputer 12 further executes a power supply stop processes shown in FIG. 4 to FIG. 7, each of which is repeatedly executed every predetermined time period (for example, 0.1 second). The power supply stop process differs in some contents, depending upon the sort of the program stored in the built-in memory of the microcomputer 12.

Figure 4:
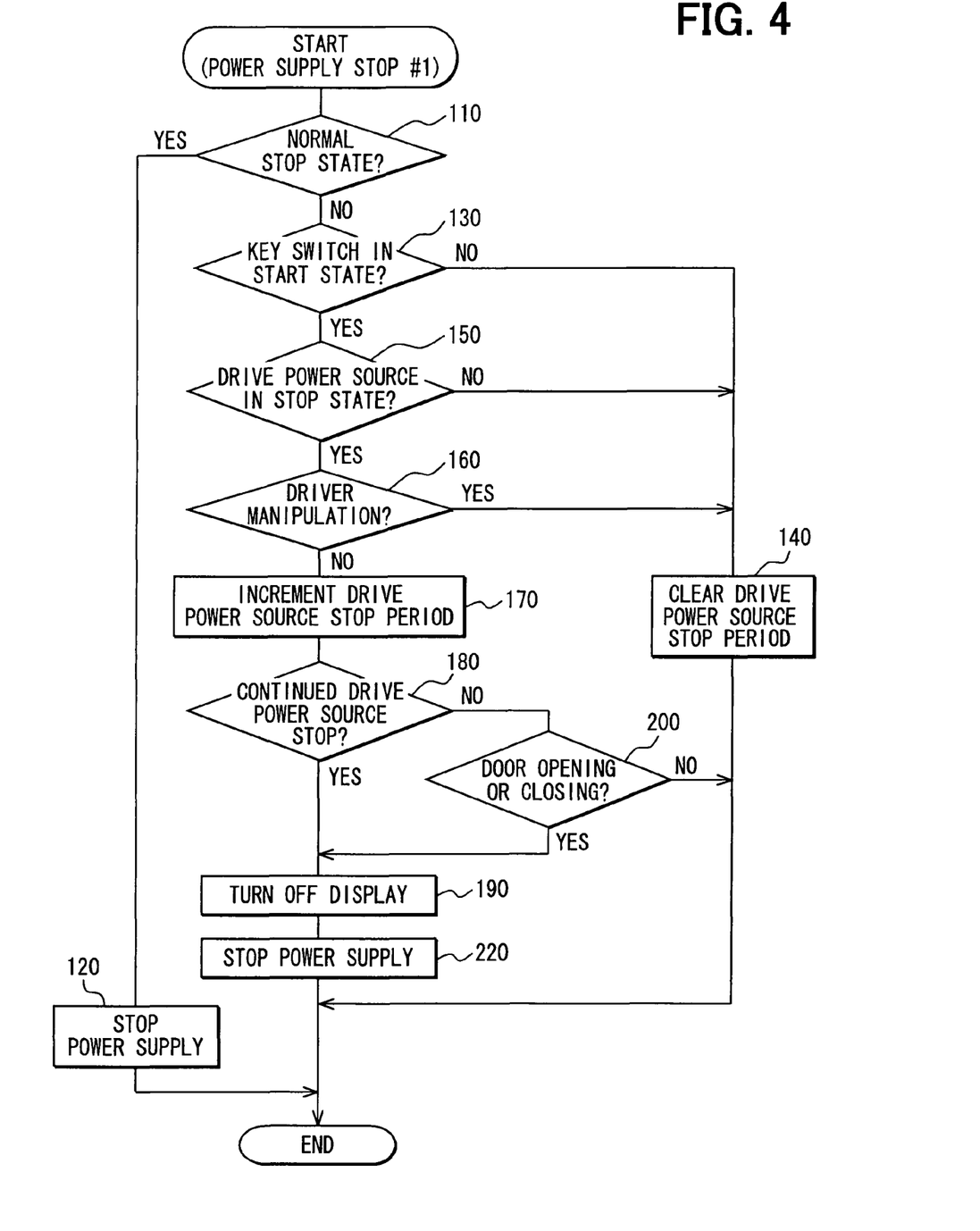
FIG. 4 is a first flow chart showing a first power supply stop process executed in the drive control apparatus of FIG. 2.

A first example of the power supply stop process is shown in FIG. 4. When the power supply stop process is started, whether or not the drive control apparatus 1 is in a normal (ordinary) state (normal stop state) for stopping the power supply to the microcomputer 12 is first checked (step 110). Here, the normal stop state is determined on the ground of the end of a process for a well-known main relay control as is executed concurrently with the power supply stop process, after the manipulation of stopping the drive power source by the key switch 25 (changeover manipulation to an OFF side).

When the drive control apparatus 1 is in the normal stop state (step 110: YES), the power supply stop process is ended by stopping the power supply to the drive control apparatus 1 (step 120). At step 120, a command to the effect of actuating the power supply switch 14 for stopping the power supply is delivered from the microcomputer 12 to the opening/closing command circuit 16, and the opening/closing command circuit 16 having received the command actuates the power supply switch 14 thereby to stop the power supply.

When the manipulation of starting the drive power source (changeover manipulation to the ON side) is performed by the key switch 25, or when a command is received from the outside (for example, a soak timer), the microcomputer 12 gives the power supply switch 14 a command to the effect of closing the power supply line which extends from the battery 21 to the microcomputer 12. The supply line is held in a closed state by the power supply switch 14 having received the command. At step 120, however, the command to the effect of opening the supply line is given to the power supply switch 14, and the supply line is opened by the power supply switch 14 having received the command, whereby the power supply to the drive control apparatus 1 is stopped. In this way, the drive control apparatus 1 stops its operation by the stop of the power supply from the battery 21.

The opening/closing command circuit 16 thus having opened the supply line by the power supply switch 14 actuates the power supply switch 14 to close the supply line again, when the manipulation of restarting the drive power source is performed after the manipulation of stopping the drive power source by the key switch 25. In this way, the power supply to the microcomputer 12 is restarted, and the microcomputer 12 restarts its operation.

On the other hand, when the drive control apparatus 1 is not in the normal stop state (step 110: NO), whether or not the drive control apparatus 1 is in a state (start state) where the manipulation of starting the drive power source is performed by the key switch 25 is checked (step 130). In this embodiment, one terminal in the key switch 25 is connected to the battery 21, and the other terminal to the microcomputer 12. Therefore, the signal which is inputted to the microcomputer 12 through the key switch 25 becomes an L level when the key switch 25 is changed over to the OFF side, whereas it becomes the signal level (H level) of the supply voltage signal fed from the battery 21, when the key switch 25 is changed over to the ON side. In addition, at step 130, the changeover of the key switch 25 onto the ON side is determined on the ground that the signal level of the signal inputted from the key switch 25 has a sufficiently high signal level.

When the drive control apparatus 1 is in a state (stop state) where the manipulation of stopping the drive power source is performed by the key switch 25 (step 130: NO), a condition holding time period (drive power source stop period) is cleared (step 140), and the power supply stop process is thereafter ended. The condition holding time period is a variable provided for counting a duration time for which a power supply stop condition holds. In addition, processing for setting 0 being an initial value, as the condition holding time period is executed at step 140.

When the drive control apparatus 1 is in the state (start state) where the manipulation of starting the drive power source is performed by the key switch 25 (step 130: YES), whether or not the drive power source is in a stop state is checked (step 150). Here, the signal from the drive power source sensor for detecting the revolution number of the drive power source is inputted, and the stop of the drive power source is determined in a case where the revolution number indicated by this signal is, at most, a predetermined threshold value (a revolution number at which the drive power source can be regarded as being stopped).

When the drive power source is not in the stop state (step 150: NO), the power supply stop process is ended after the shift of this process to step 140.

When the drive power source is in the stop state (step 150: YES) due to the forced stop performed at step 370 (FIG. 3), whether or not a predetermined manipulation for the vehicle is performed by the driver or other person (driver or the like) is checked based on the output signals from the ECUs other than the body ECU 32 or from the sensors (step 160). Here, the predetermined manipulation for the vehicle may include a manipulation by way of a tool, etc. by a repair man or service staff. Specifically, step 160 may check based on the various output signals whether or not a manipulation for the navigation apparatus, a manipulation for the audio equipment, a manipulation for the air-conditioner, a manipulation for a power window, a manipulation for locking or unlocking the door in the vehicle, the manipulation of a steering wheel, the accelerator pedal, the brake pedal or the side brake, or the like is performed since the last power supply stop process.

When the predetermined manipulation for the vehicle is performed (step 160: YES), the power supply stop process is ended after the shift of this process to step 140.

On the other hand, when the predetermined manipulation for the vehicle is not performed (step 160: NO), the condition holding time period indicating the drive power source stop period is incremented (1 is added to the condition holding time period) (step 170). Thereafter, whether or not a value set in the condition holding time period reaches a predetermined threshold value (for example, 3000) is checked (step 180). This step 180 checks whether the drive power source stop is continuing. The threshold value is previously set as the time period of, at least, a time period which is supposed necessary until the driver or the like notices the stop of the engine in spite of the turn-on of the key switch 25 and then takes a measure such as the performance of the manipulation of stopping the drive power source by the key switch 25.

If the value set in the condition holding time period reaches the threshold value at step 180 (step 180: YES), a command to the effect of turning off the display of various information items on an instrument panel within a vehicular compartment given to the meter ECU 36 via the network 30 (step 190). The meter ECU 36 receives the command and turns off the display of the various information items on an instrument panel in the vehicle.

The power supply stop process is ended after the power supply to the drive control apparatus 1 is stopped (step 220). At step 220, in the same manner as at step 120, the opening/closing command circuit 16 receives the command from the microcomputer 12 and actuates the power supply switch 14 to open the power supply line to the microcomputer 12, whereby the power supply to the drive control apparatus 1 is stopped. In this manner, the stop of the power supply at step 220 is performed under the drive power source stop condition, in which the condition holding time period reached the threshold value, premising that the drive power source stopped in the state (start state) where the manipulation of starting the drive power source is performed by the key switch 25 and that the predetermined manipulation except the operation of opening/closing the door is not performed in the state, or in which the operation of opening/closing the door is performed before the threshold value is reached.

If the value set in the condition holding time period is less than the threshold value at step 180 (step 180: NO), that is, the drive power source stop period is no so long, whether or not the operation of opening/closing the door in the vehicle is performed is checked (step 200). Here, the performance of the operation of opening/closing the door is determined in a case where the output signal which indicates the opening of the door in the vehicle or the closure of the door after the opening thereof is transmitted from the body ECU 32 before step 200 is executed since the last power supply stop process.

When it is determined at step 200 that the operation of opening/closing the door in the vehicle is performed (step 200: YES) indicating that the driver leaves the vehicle for instance, the process proceeds to step 190, at which the command to the effect of turning off the display of the various information items on the instrument panel in the vehicular compartment is given to the meter ECU 36 (step 190), and the power supply to the drive control apparatus 1 is stopped (step 220), whereupon the power supply stop process is ended.

On the other hand, when it is determined at step 200 that the operation of opening/closing the door in the vehicle is not performed (step 200: NO), the power supply stop process is ended without executing steps 190 and 220 because the driver is considered to be still in the vehicle.

Figure 5:
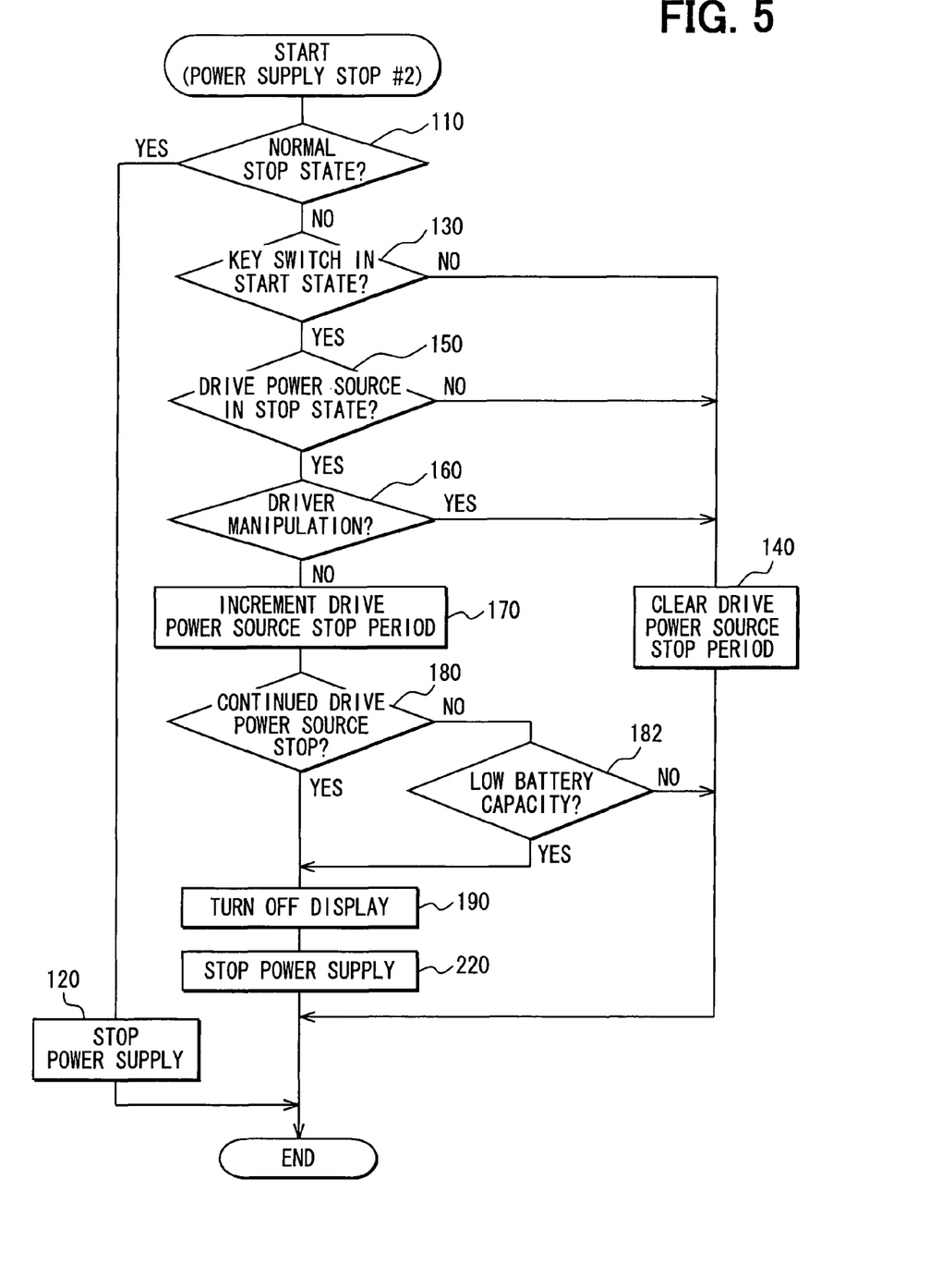
FIG. 5 is a flow chart showing a second power supply stop process executed in the drive control apparatus of FIG. 2.

A second example of the power supply stop process is shown in FIG. 5. When the power supply stop process is started, steps 110 to 180 are executed in the same manner as in the first example shown in FIG. 4. Thereafter, when the value set in the condition holding time period is less than the threshold value (step 180: NO), whether or not the remaining capacity of the battery 21 is, at most, a predetermined threshold value is checked (step 182). Here, the remaining capacity of the battery 21 is determined to be, at most, the threshold value, in a case where a voltage value which is indicated by an output signal from a sensor (not shown) for detecting the voltage value of the battery 21 lowered to or below a fixed value. The threshold value is a value (for example, 60% of a capacity in a normal state) previously set as that remaining capacity of the battery 21 which is required for actuating various parts in the vehicle.

When the remaining capacity of the battery 21 becomes less than the predetermined threshold value (step 182: YES), the process proceeds to step 190, at which the command to the effect of turning off the display of the various information items on the instrument panel in the vehicular compartment is given to the meter ECU 36 (step 190), and the power supply to the drive control apparatus 1 is stopped (step 220), whereupon the power supply stop process is ended.

In the power supply stop process, the stop of the power supply at step 220 is performed under the power supply stop condition, in which the condition holding time period reaches the threshold value, premising that the drive power source stopped in the start state where the manipulation of starting the drive power source is performed by the key switch 25 and that the predetermined manipulation except the operation of opening/closing the door is not performed in the state, or in which the remaining capacity of the battery 21 becomes less than the threshold value before the threshold value of the condition holding time period is reached.

On the other hand, when the remaining capacity of the battery 21 does not, at most, the predetermined threshold value yet (step 182: NO), the power supply stop process is ended without executing steps 190 and 220.

Figure 6:
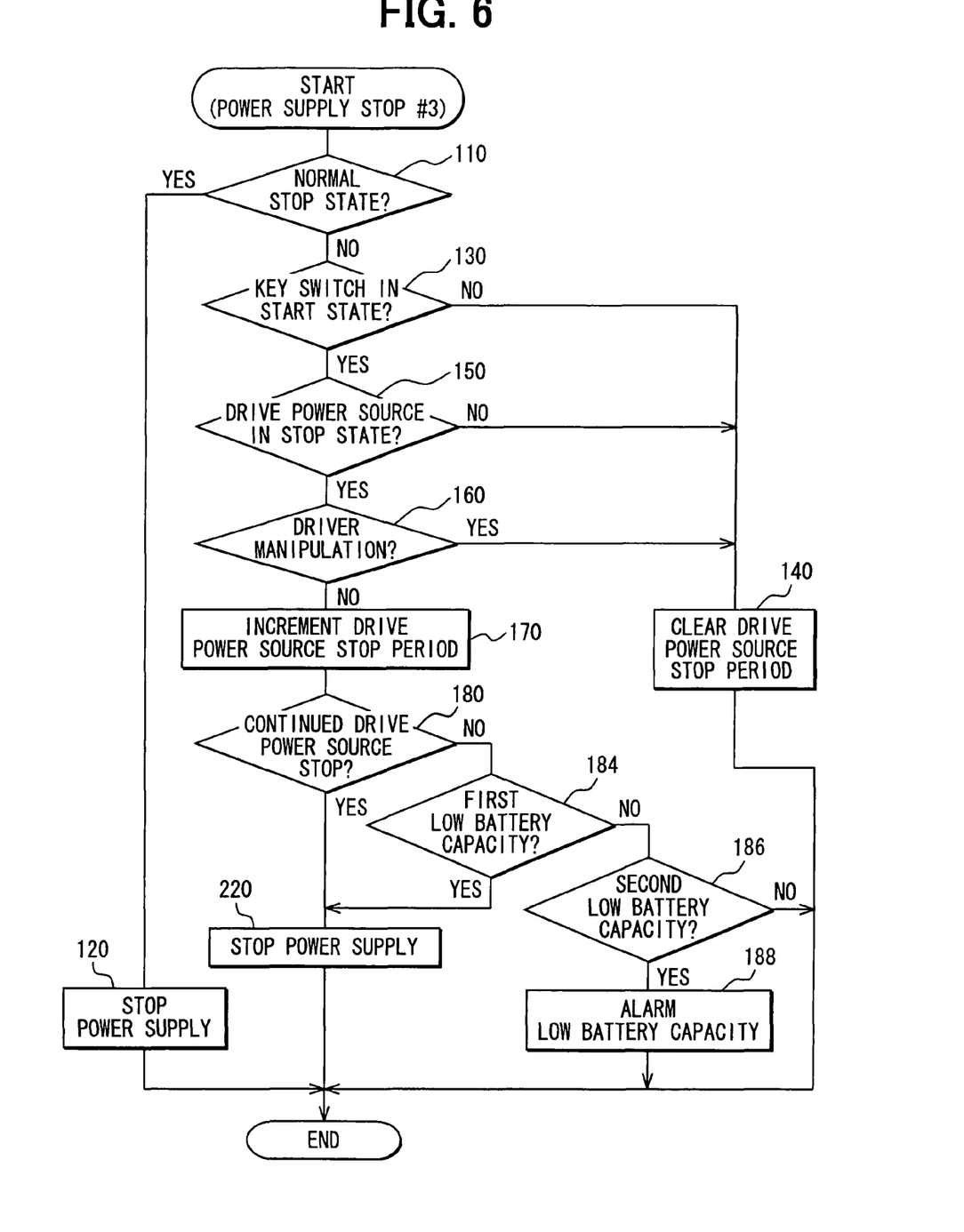
FIG. 6 is a flow chart showing a third power supply stop process executed in the drive control apparatus of FIG. 2.

A third example of the power supply stop process is shown in FIG. 6. When the power supply stop process is started, steps 110 to 180 are executed in the same manner as in the first and the second examples shown in FIGS. 4 and 5. Thereafter, when the value set in the condition holding time period is less than the threshold value at step 180 (step 180: NO), whether or not the remaining capacity of the battery 21 is, at most, a first threshold value (first low battery capacity state) is checked (step 184). Here, the remaining capacity of the battery 21 is determined to be, at most, the first threshold value, in a case where a voltage value which is indicated by an output signal from a sensor (not shown) for detecting the voltage value of the battery 21 is lowered to or below a fixed value (for example, 60% of a capacity in a normal state).

When the remaining capacity of the battery 21 becomes less than the first threshold value (step 184: YES), the process proceeds to step 220, at which the power supply to the drive control apparatus 1 is stopped, and the power supply stop process is thereafter ended. In the power supply stop process, the stop of the power supply at step 220 is performed under the power supply stop condition, in which the condition holding time period reaches the threshold value, premising that the drive power source is stopped in the start state where the manipulation of starting the drive power source is performed by the key switch 25 and that the predetermined manipulation except the operation of opening/closing the door is not performed in the state, or in which the remaining capacity of the battery 21 becomes less than the first threshold value before the threshold value of the condition holding time period is reached.

On the other hand, when the remaining capacity of the battery 21 does not becomes less than the first threshold value (step 184: NO), whether or not the remaining capacity of the battery 21 becomes less than a second threshold value (second low battery capacity state) higher than the first threshold value is checked (step 186). Here, the remaining capacity of the battery 21 is determined to be, at most, the second threshold value, in a case where a voltage value which is indicated by the output signal from the sensor for detecting the voltage value of the battery 21 is a value which is larger than the fixed value (60% of the capacity in the normal state) at step 184 and which is, at most, a predetermined value (for example, 75% of the capacity in the normal state) larger than the fixed value.

When the remaining capacity of the battery 21 becomes less than the second threshold value (step 186: YES), an alarm of low battery capacity is given (step 188), and the power supply stop process is thereafter ended. At step 188, a command is given from the microcomputer 12 to the audio ECU to the effect that a message ought to be outputted for reporting the stop of the drive power source in spite of the start state (the state where the manipulation of starting the drive power source is performed by the key switch 25). Besides, the audio ECU having received the command outputs the message from a loudspeaker or a display portion in the audio equipment. Thus, the driver or the like is warned that the drive power source is in the stop state in spite of the start state thereof.

When it is determined at step 186 that the remaining capacity of the battery 21 is not less than the second threshold value yet (step 186: NO), the power supply stop process is ended without executing step 188.

Figure 7:
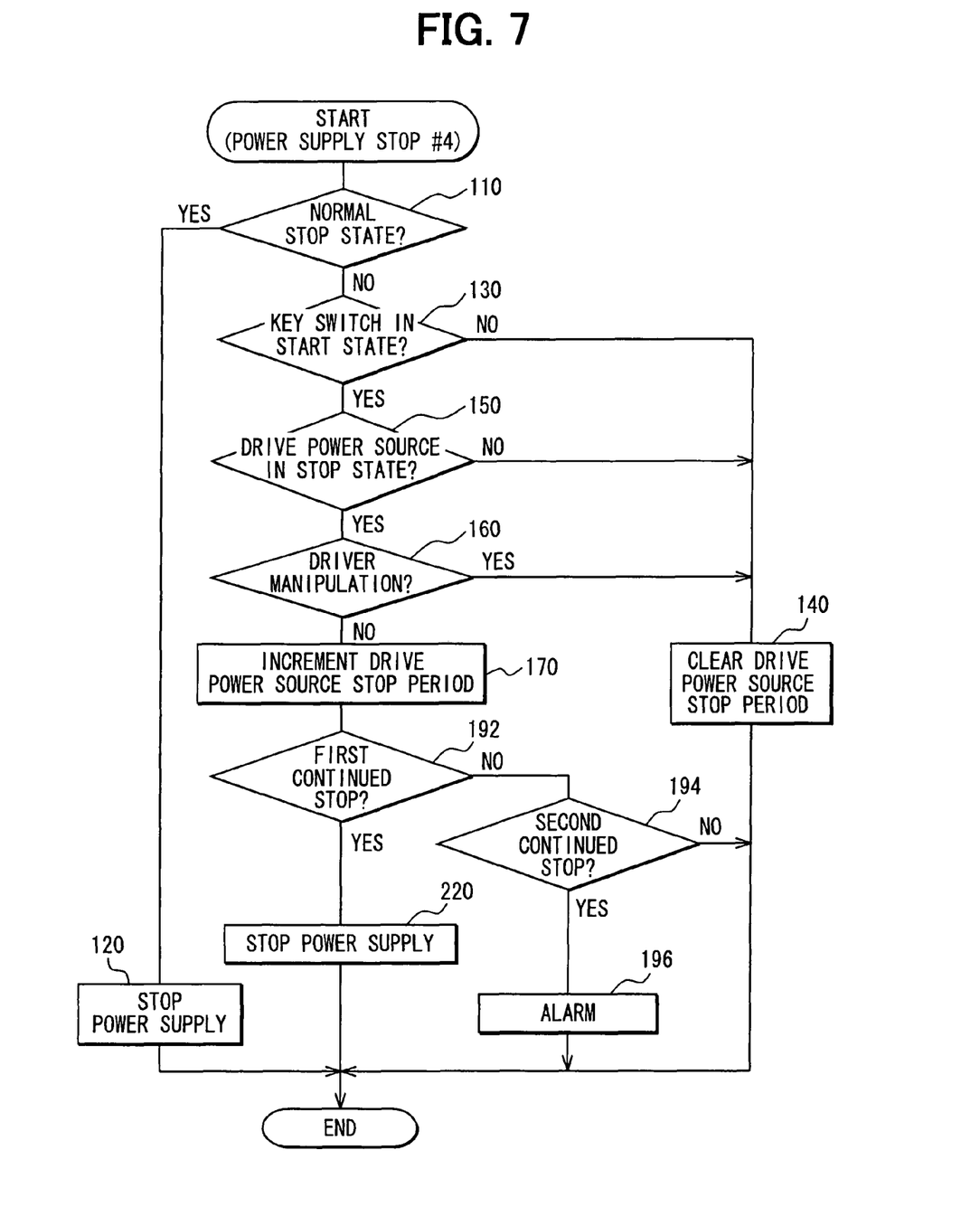
FIG. 7 is a flow chart showing a fourth power supply stop process executed in the drive control apparatus of FIG. 2.

A fourth example of the power supply stop process is shown in FIG. 7. When the power supply stop process is started, steps 110 to 170 are executed in the same manner as in the first to the third examples shown in FIGS. 4 to 6. Thereafter, whether or not the value set in the condition holding time period reaches a first threshold value (first continued stop) is checked (step 192). The first threshold value is the same value (3000) as the predetermined threshold value at step 180.

When the value set in the condition holding time period reaches the first threshold value (step 192: YES), the process proceeds to step 220, at which the power supply to the drive control apparatus 1 is stopped, whereupon the power supply stop process is ended. In the power supply stop process, the stop of the power supply at step 220 is performed under power source stop condition in which the condition holding time period reaches the first threshold value, premising that the drive power source is stopped in the start state (the state where the manipulation of starting the drive power source is performed by the key switch 25) and that the predetermined manipulation except the operation of opening/closing the door is not been performed in the state.

On the other hand, when the value set in the condition holding time period is less than the first threshold value (step 192: NO), whether or not the value set in the condition holding time period reaches a second threshold value (second continued stop) is checked (step 194). The second threshold value is determined as a value (for example, 600) which is less than the first threshold value at step 192. That is, the first continued stop period detected at step 192 for stopping the power supply is longer than the second continued stop period detected at step 194 for alarming the continued stop of the drive power source. Thus, only when the drive power source continues to stop after alarming the continued stop at step 196, the power supply is stopped at step 220.

When the value set in the condition holding time period reaches the second threshold value (step 194: YES), an alarm is given (step 196), and the power supply stop process is thereafter ended. At step 196, in the same manner as at step 188 in FIG. 6, the audio ECU receiving the command from the microcomputer 12 outputs the message from the loudspeaker or display portion in the audio equipment, whereby the driver or the like is warned that the drive power source is at the stop in spite of the start state thereof.

When the value set in the condition holding time period is less than the second threshold value (step 194: NO), the power supply stop process is ended without executing step 196.

Figure 8:
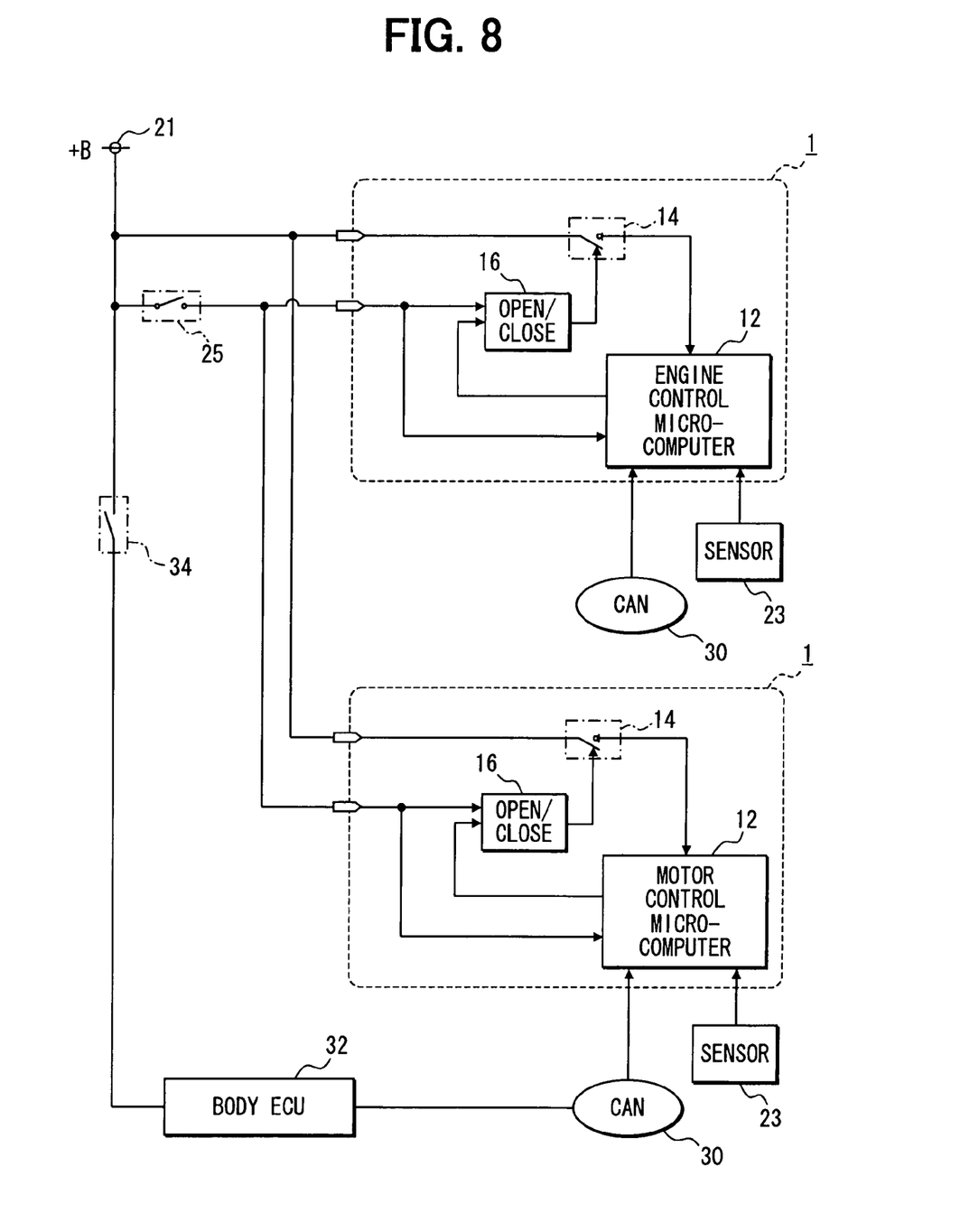
FIG. 8 is a block diagram showing another vehicle control system using a drive control apparatus according to the present invention.

A vehicle control system may be constructed to have two drive power control apparatuses 1 as shown in FIG. 8. The control apparatuses 1 are an engine control apparatus including an engine control microcomputer 12 and a motor control apparatus including a motor control microcomputer 12. A fifth example of the power supply stop processes of the engine control apparatus 1 and the motor control apparatus 1 are shown in FIGS. 9 and 10.

Figure 9:
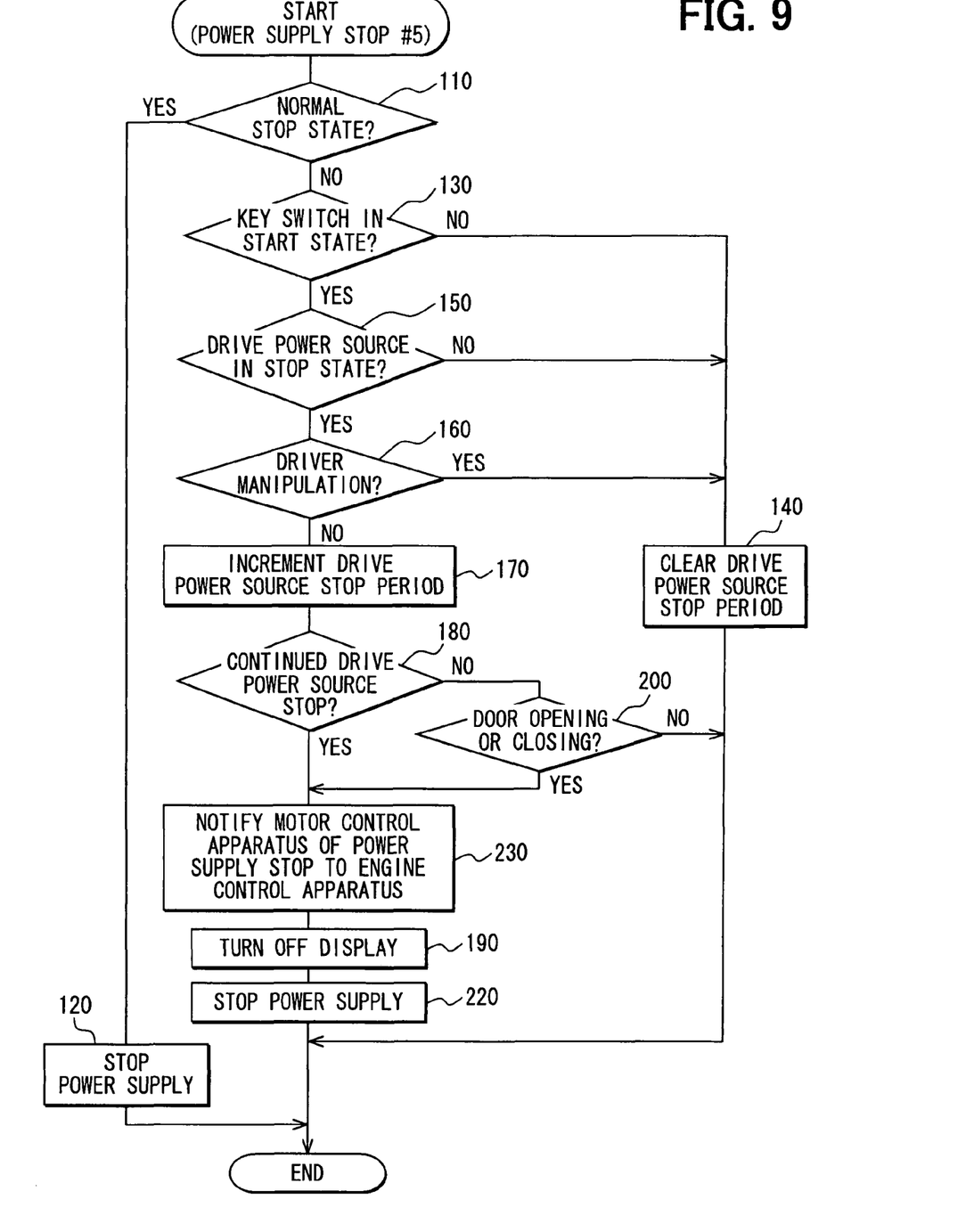
FIG. 9 is a flow chart showing a fifth power supply stop process executed in the drive control apparatus of FIG. 8 for engine control.

Referring to FIG. 9, in the microcomputer 12 of the engine control apparatus 1, steps 110-200 are executed in the same manner as in the first example shown in FIG. 4. In case of the determination of YES at step 180 or step 200, it is notified to the motor control apparatus 1 via the network 30 that power supply to the engine control apparatus 1 itself is stopped (step 230), and the process thereafter proceeds to step 190.

Figure 10:
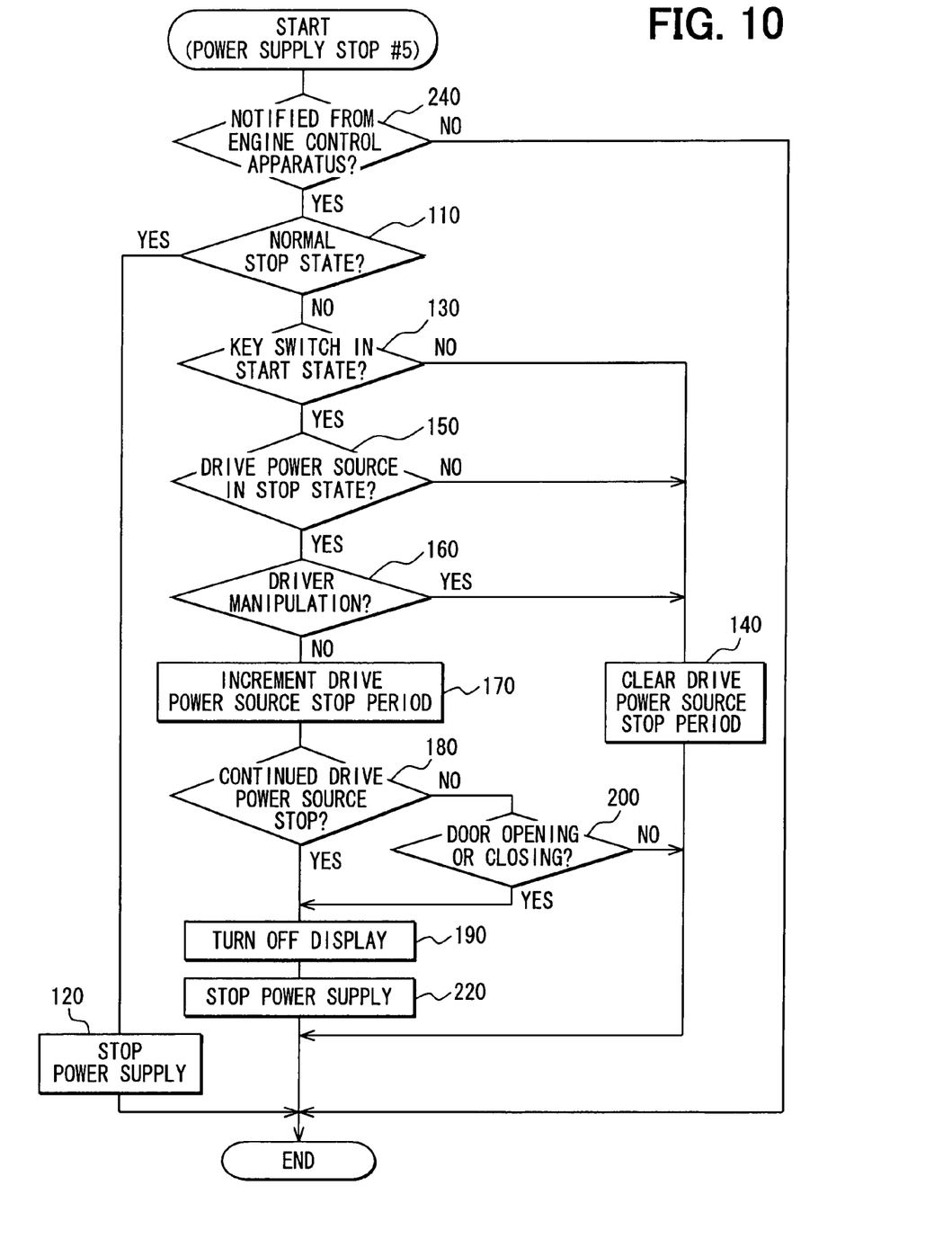
FIG. 10 is a flow chart showing a fifth power supply stop process executed in the drive control apparatus of FIG. 8 for motor control.

Meanwhile, as shown in FIG. 10, in the microcomputer of the motor control apparatus 1, whether or not the notification of stopping power supply to the motor control apparatus 1 is received from the engine control apparatus 1 is checked (step 240).

If the notification to the above effect is not received (step 240: NO), the power supply stop process is immediately ended. If the notification to the above effect is received (step 240: YES), the process proceeds to step 110 and steps 110 to 220 are executed in the similar manner as the first example shown in FIG. 4.

According to the above control operation, even when the drive power source is stopped in the start state where the manipulation of starting the drive power source is performed on the key switch 25 by the driver or the like, the power supply to any of the drive control apparatuses 1 is automatically stopped under the predetermined condition (step 220 in any of FIGS. 4 to 7, FIG. 9 and FIG. 10). It is therefore possible to reduce unnecessary consumption of the electric power of the battery 21. It is consequently possible to start the drive power source again.

When the condition holding time period reaches the threshold value (step 180 or step 192 in any of FIGS. 4 to 7, FIG. 9, and FIG. 10) after the stop of the drive power source (YES at step 150 in any of FIGS. 4 to 7, FIG. 9, and FIG. 10), the electric power supply from the battery 21 to any of the drive control apparatuses 1 can be stopped (step 220 in any of FIGS. 4 to 7, FIG. 9, and FIG. 10). The predetermined time period is set as the time period of, at least, a time period which is supposed necessary until the driver or the like notices the stop of the drive power source and then takes a measure such as the performance of the manipulation of stopping the drive power source by the key switch 25. It is therefore possible to prevent unnecessary consumption of the battery 21 even after the stop of the drive power source.

In each of the embodiments, in the case where the operation of opening/closing the door is performed (step 200 in FIG. 4, FIG. 9, or FIG. 10) after the stop of the drive power source (YES at step 150 in FIG. 4, FIG. 9, or FIG. 10), the power supply from the battery 21 to any of the drive control apparatuses 1 can be stopped (step 220 in FIG. 4, FIG. 9, or FIG. 10) irrespective of the elapsed time period after the stop of the drive power source. The situation where the operation of opening/closing the door in the vehicle is performed after the stop of the drive power source in this manner indicates that the driver or the like leaves from the vehicle without noticing the stop of the drive power source. This situation is unfavorable, because the measure by the driver or the like is not taken after the stop of the drive power source, so the battery 21 is merely consumed unnecessarily. Therefore, to stop the power supply to the drive control apparatus 1 under the condition as stated above is well suited to prevent the unnecessary consumption of the battery 21 in the case where the driver or the like is supposed to leave the vehicle without noticing the stop of the drive power source.

The alarm is given (step 188 in FIG. 6) when the remaining capacity of the battery 21 becomes less than the second threshold value. Therefore, before the stop of the power supply to the drive control apparatus 1, it can be warned and notified to the driver or the like that the drive power source is stopped in the state where the power supply is continued. Accordingly, the driver or the like can take the measure such as the performance of the manipulation of stopping the drive power source by the key switch 25, upon receiving the alarm, whereby the power supply to the drive control apparatus 1 can be immediately stopped, so that the unnecessary consumption of the battery 21 can be prevented more effectively.

The alarm is given (step 196 in FIG. 7) in the case where the value set in the condition holding time period reaches the second threshold value. Therefore, before the stop of the power supply to the drive control apparatus 1, it can be warned and notified to the driver or the like that the drive power source is stopped in the state where this power supply is continued. Accordingly, the driver or the like can take the measure such as the performance of the manipulation of stopping the drive power source by the key switch 25, upon receiving the alarm, whereby the power supply to the drive control apparatus 1 can be immediately stopped, so that the unnecessary consumption of the battery 21 can be prevented more effectively.

When the remaining capacity of the battery 21 becomes less than the threshold value (YES at step 182 in FIG. 5 or step 184 in FIG. 6) after the stop of the drive power source (YES at step 150 in FIG. 5 or FIG. 6), the power supply from the battery 21 to the drive control apparatus 1 can be stopped (step 220 in FIG. 5 or FIG. 6). Since the threshold value is a value set as that remaining capacity of the battery 21 which is necessary for actuating the various parts in the vehicle, it is possible to prevent the battery 21 from continuing to supply the power until the various parts fail to be actuated, even after the stop of the drive power source.

The display of the various information items on the instrument panel is turned off (step 190 in FIG. 4, FIG. 5, FIG. 9, or FIG. 10) when the power supply stop condition for stopping the power supply is satisfied (YES at step 180 or step 192 in FIG. 4, FIG. 5, FIG. 9, or FIG. 10) after the forced stop of the drive power source of the vehicle as is based on the fulfillment of the predetermined shutdown condition (step 370 in FIG. 3). The turning off of the display of the information items on the instrument panel results in turning off the information items from the field of view of the driver. It is therefore possible that the driver can easily recognized the forced stop of the drive power source.

In the case of the fifth example of the power supply stop process, the power supply to the motor control apparatus 1 can be stopped after the stop of the power supply to the engine control apparatus 1.

The present invention is not limited to the foregoing embodiments, but various modifications can be made to the above embodiments. Some examples are as follows.

The drive control apparatus may well be applied to another ECU other than the engine control or the motor control.

In so far as each of the drive control apparatuses 1 can commands the opening/closing command circuit 16 to actuate the power supply switch 14, the opening/closing command circuit 16 and a circuit for causing the opening/closing command circuit 16 to operate may be differently configured.

The drive control apparatus 1, may well be configured to be capable of stopping power supply to one or more ECUs which does/do not include the ECU of the apparatus itself or which include the ECU of the apparatus itself. For this purpose, the drive control apparatus may be so configured that the opening/closing command circuit 16 gives the command of opening the power supply line, directly or via the network 30 to other parts each of which corresponds to the power supply switch 14 in each of the ECUs, and that each of the parts receiving the command opens the power supply line. Alternatively, the drive control apparatus may be so configured that the opening/closing command circuit 16 gives the command of opening the power supply line, directly or via the network 30 to each of the ECUs, and that each of the ECUs receiving the command opens the power supply line.

In a case where a device for monitoring the operation state of the drive power source is further mounted on the vehicle, whether or not the drive power source is stopped may well be detected by receiving the notification of a monitored result (information which indicates the revolution number of the drive power source or whether or not the drive power source is stopped) from the device.

Although the power supply to the drive control apparatus 1 is stopped under the conditions that the engine is stopped (YES at step 150 in any of FIGS. 4 to 8) in the state where the key switch 25 is ON (YES at step 130 in any of FIGS. 4 to 8), and that the predetermined manipulation is not been performed (YES at step 160 in any of FIGS. 4 to 8), any other condition may well be adopted as the condition for stopping the power supply to the drive control apparatus 1 as long as it can prevent the battery 21 from being unnecessarily consumed.

Although the opening/closing operation of only the door on the driver's seat side is detected at step 200, it is also allowed to adopt a configuration in which opening/closing operations are detected for a plurality of doors including the door on the driver's seat side. In this case, whether or not the opening/closing operation is performed for at least one of the plurality of doors whose opening/closing operations are detectable may be determined at step 200.

Although the performance of the opening/closing operation of the door is detected by receiving the notification from the body ECU 32, it is also allowed to adopt a configuration in which the performance of the opening/closing operation of the door is directly detected from the changeover state of the door switch 34. Specifically, a terminal on a side connected to the body ECU 32 in the door switch 34 may be connected to the microcomputer 12.

Although the alarm is performed by outputting the message from the audio ECU (step 188 in FIG. 6, or step 196 in FIG. 7), the alarm may well be performed through any output devices (loudspeaker, display portion, lamp, or the like) which the microcomputer 12 can directly control.

Although the condition for stopping the power supply from the battery 21 to the drive control apparatus 1 (step 220 in FIG. 5, or FIG. 6) after the stop of the engine (YES at step 150 in FIG. 5, or FIG. 6) is that the remaining capacity of the battery 21 is, at most, the remaining capacity of the battery 21 as is necessary for actuating the various parts in the vehicle (YES at step 182 in FIG. 5, or step 184 in FIG. 6), as the remaining capacity, a capacity which is sufficient for starting the drive power source again may well be set in the battery 21. In this case, it is possible to prevent the situation where the drive power source fails to be started again.

Although, when the performance of the door opening/closing operation after the last power supply stop process and before the execution of step 200 in FIG. 4 is detected, the power supply to the drive control apparatus 1 is stopped without regard to the value set in the condition holding time period, a determination as to whether or not the door opening/closing operation is performed before the stop of the drive power source may well be additionally adopted as the condition for stopping the power supply to the drive control apparatus 1. Here, it can be the that the situation where the door opening/closing operation in the vehicle is performed before the stop of the engine indicates a situation where the driver or the like leaves the vehicle with the drive power source held started. Such a situation is unfavorable because the measure by the driver or the like is not taken after the stop of the drive power source, so the battery 21 is merely consumed unnecessarily.

Figure 11:
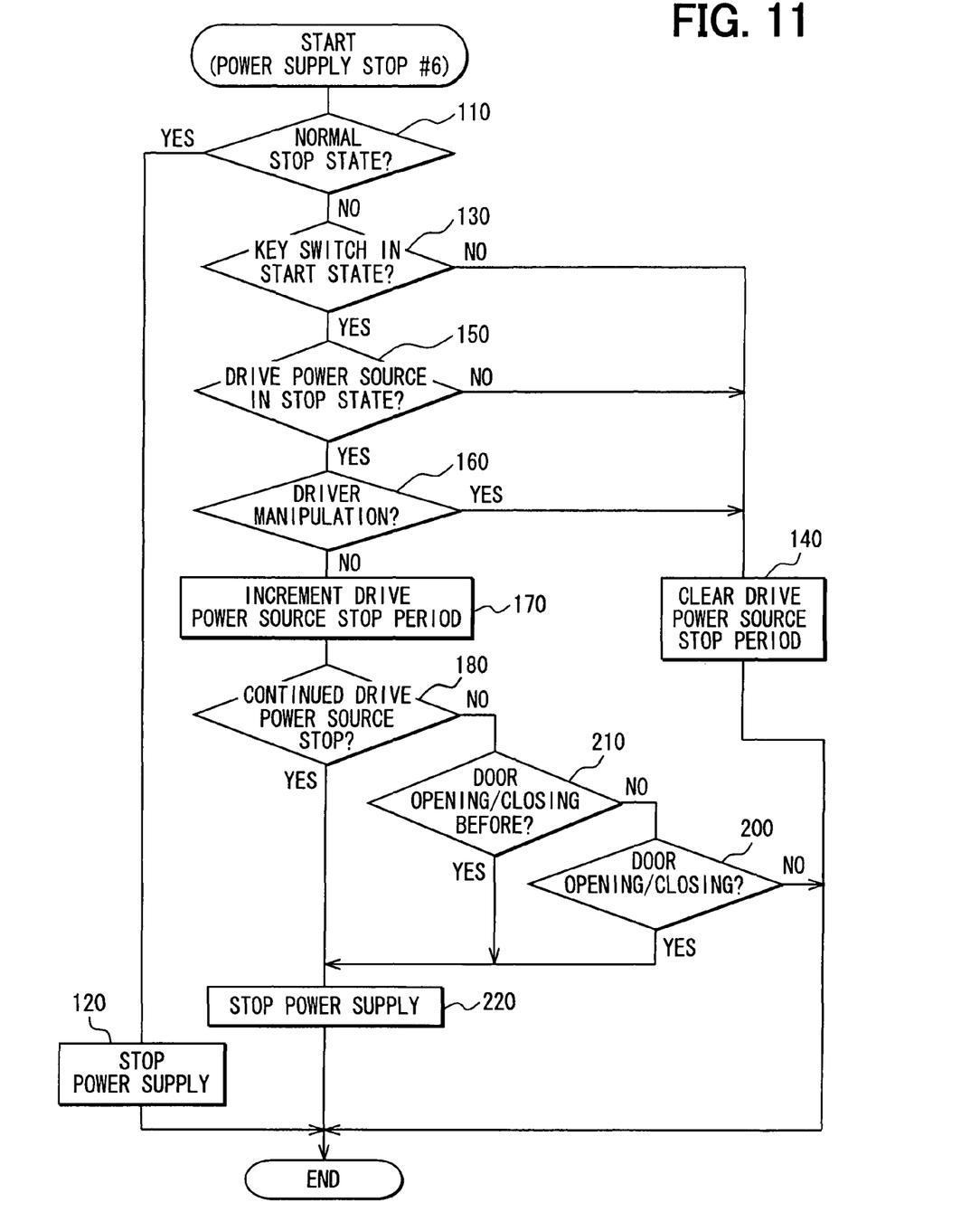
FIG. 11 is a flow chart showing a sixth power supply stop process in another drive control apparatus according to the present invention.

In this case, the body ECU 32 is so configured that, when a detection result from the door switch 34 changes, this body ECU 32 stores the time of the change therein, and that, when a request from the microcomputer 12 is received, this body ECU 32 sends back an elapsed time period since the last time at which the door opening/closing operation is performed. In addition, when NO is determined at step 180 in FIG. 4, this microcomputer 12 requests the body ECU 32 to send the elapsed time period. It checks, as shown as a sixth example shown in FIG. 11, whether or not the door opening/closing is detected before, that is, whether the elapsed time period sent back in response to the request is, at least, a predetermined time period (for example, 5 minutes) before the present time (step 210). Besides, when the elapsed time period is not, at least, the predetermined time period before the present time (step 210: NO), the process proceeds to a step 200. On the other hand, when the elapsed time period is, at least, the predetermined time period before the present time (step 210: YES), the process proceeds to step 220 without executing step 200.

With such a configuration, when it is supposed that the driver or the like leaves the vehicle in the state where the drive power source is held in the start state, the power supply to the drive control apparatus can be stopped with a trigger being the subsequent stop of the drive power source.

Regarding turning off of the display of the various information items on the instrument panel (step 190 in FIG. 4 or FIG. 5), it is allowed to adopt a configuration in which, under the power supply stop condition, the provision of information by the other device is stopped, not the display of the various information items on the instrument panel. The provision of the information by the other device is, for example, the display of various information items or the output of voice by the car navigation apparatus, the display of various information items or the output of voice by the audio equipment, or the display of various information items by a manipulation for the air-conditioner. The command of stopping the provision of the information may be given to the other device directly or indirectly (via the network 30).

Although, in the fifth example, the power supply to the motor control apparatus 1 is stopped after the stop of the power supply to the engine control apparatus 1 is performed, the power supply to the engine control apparatus 1 may be stopped after the stop of the power supply to the motor control apparatus 1 is performed. For this purpose, it is allowed that the power supply stop process executed by the engine control apparatus 1 is executed by the motor control apparatus 1, while the power supply stop process executed by the motor control apparatus 1 is executed by the engine control apparatus 1.

Although the motor control apparatus 1 confirms the stop of the power supply to the engine control apparatus 1 after receiving the notification from the engine control apparatus 1, the confirmation may well be done in such a way that an inquiry is made by the motor control apparatus 1 to the engine control apparatus.

Although the key switch 25 is the changeover switch that starts the drive power source by its changeover manipulation onto the ON side and that stops the drive power source by its changeover manipulation onto the OFF side, and in which the opening/closing command circuit 16 opens/closes the power supply switch 14 in accordance with the changeover state of the changeover switch, the key switch 25, may well be a push switch which starts the drive power source by its manipulation of being depressed from the stop state of the drive power source, and which stops the drive power source by its manipulation of being depressed from the start state of the drive power source. In this case, the opening/closing command circuit 16 may open/close the power supply switch 14 in accordance with the manipulation state of the key switch 25 and which stores (latches) the manipulation state, whereupon step 130 in any of FIGS. 4 to 7, FIG. 9, and FIG. 10 checks whether or not the drive power source is in the start state, based on the manipulation state stored in the opening/closing command circuit 16.

What is claimed is:

1. A drive control apparatus for controlling a drive power source of a vehicle with power supply from a battery mounted on the vehicle, the drive control apparatus comprising:
    drive power source stop means for forcibly stopping the drive power source under a predetermined shutdown condition, which includes that a shift position of a transmission of a vehicle is neutral or parking, the drive power source being operative in other than the predetermined shutdown condition;
    stop detection means for detecting that the drive power source is forcibly stopped under the predetermined shutdown condition; and
    power supply stop means for stopping the power supply from the battery under a predetermined power supply stop condition after detection of the stop of the drive power source by the stop detection means.

2. The drive control apparatus as in claim 1, further comprising:
    time count means for counting an elapsed time period after the detection of the stop of the drive power source by the stop detection means,
    wherein the power supply stop means stops the power supply from the battery, when the elapsed time period counted by the time count means reaches a first time period.

3. The drive control apparatus as in claim 2, further comprising:
    opening/closure detection means for detecting an opening/closing operation of a door of the vehicle;
    wherein the power supply stop means stops the power supply from the battery, when the door opening/closing operation is detected by the opening/closure detection means before the elapsed time period counted by the time count means reaches the first time period.

4. The drive control apparatus as in claim 2, further comprising:
    time alarm means for giving an alarm when the elapsed time period counted by the time count means reaches a second time period shorter than the first time period.

5. The drive control apparatus as in claim 1, further comprising:
    capacity detection means for detecting a remaining capacity of the battery;
    wherein the power supply stop means stops the power supply from the battery, when the remaining capacity of the battery detected by the capacity detection means becomes less than a first capacity after the detection of the stop of the drive power source by the stop detection means.

6. The drive control apparatus as in claim 5, further comprising:
    capacity alarm means for giving an alarm when the remaining capacity of the battery detected by the capacity detection means becomes more than the first capacity and less than a second capacity larger than the first capacity after the detection of the stop of the drive power source by the stop detection means.

7. The drive control apparatus as in claim 1, further comprising:
    information stop means for stopping provision of information on various information items to a driver of the vehicle, when the power supply stop means stops the power supply from the battery.

8. The drive control apparatus as in claim 1,
    wherein the drive power source is an internal combustion engine.

9. The drive control apparatus as in claim 1,
    wherein the drive power source is an electric motor.

10. A vehicle control system comprising:
    an engine control apparatus including the drive control apparatus as in claim 8; and
    a motor control apparatus for controlling an electric motor,
    wherein the engine control apparatus and the motor control apparatus controls the engine and the motor, respectively, in coordination with each other.

11. A vehicle, control system comprising:
    an engine control apparatus including a drive control apparatus for controlling an internal combustion engine of a vehicle with power supply from a battery mounted on the vehicle, the drive control apparatus of the engine control apparatus comprising:
        stop detection means for detecting that the internal combustion engine is forcibly stopped under a predetermined shutdown condition: and
        power supply stop means for stopping the power supply from the battery under a predetermined power supply stop condition after detection of the stop of the internal combustion engine by the stop detection means of the engine control apparatus;
    a motor control apparatus including a drive control apparatus for controlling an electric motor of the vehicle with power supply from the battery mounted on the vehicle, the drive control apparatus of the motor control apparatus comprising:
        stop detection means for detecting that the electric motor is forcibly stopped under a predetermined shutdown condition; and
        power supply stop means for stopping the power supply from the battery under a predetermined power supply stop condition after detection of the stop of the electric motor by the stop detection means of the motor control apparatus; wherein:
    the engine control apparatus and the motor control apparatus Controls the engine and the motor, respectively, in coordination with each other;
    one of the engine control apparatus and the motor control apparatus includes stop confirmation means for confirming that power supply to the other of the engine control apparatus and the motor control apparatus is stopped, via communications with the other of the control devices; and the stop detection means of the one of the control apparatuses detects a forced stop of the internal combustion engine or electric motor thereof after the stop of the power supply to the other of the control apparatuses is confirmed by the stop confirmation means of the one of the control apparatuses.

12. A drive control method for controlling a drive power source of a vehicle by a drive control apparatus operated with a power supply from a battery mounted on the vehicle, the drive control method comprising:
  detecting a predetermined power source operation stop condition, which includes that a shift position of a transmission of the vehicle is neutral or parking;
  stopping automatically an operation of the drive power source of the vehicle when the predetermined power source operation stop condition is detected, while maintaining the operation of the drive power source in a condition other than the predetermined power source operation stop condition;
  detecting an operation stop time period in which the operation of the drive power source is continuously stopped; and
  stopping automatically a supply of electric power from the battery to the drive control apparatus when the operation stop time period reaches a predetermined time period.

13. The drive control apparatus as in claim 1, wherein:
  the predetermined shutdown condition further includes that a vehicle travel speed is lower than a predetermined travel speed, a rotation speed of the drive power source is stable at a predetermined rotation speed, and the shift position, the vehicle travel speed and stable operation of the drive power source continue for more than a predetermined time period.

14. The drive control apparatus as in claim 1, wherein:
  the drive power source stop means and the stop detection means are implemented in an electronic computer operable with the power supply from the battery; and
  the power supply stop means includes a switch, which stops the power supply from the battery to the electronic computer when turned off.

15. A vehicle control system comprising:
  an engine control apparatus for controlling an internal combustion engine; and
  a motor control apparatus including the drive control apparatus as in claim 9,
  wherein the engine control apparatus and the motor control apparatus controls the engine and the motor, respectively, in coordination with each other.

16. The method as in claim 12, further comprising:
  detecting an opening/closing operation of a door of the vehicle;
  wherein the supply of electric power from the battery is stopped when the door opening/closing operation is detected before the operation stop time period reaches the predetermined time period.

17. The method as in claim 12, further comprising:
  providing an alarm when the operation stop time period which has elapsed reaches another time period shorter than the predetermined time period.

18. The method as in claim 12, further comprising:
  detecting a remaining capacity of the battery;
  wherein the supply of electric power from the battery is stopped when the detected remaining capacity of the battery becomes less than a first capacity after the predetermined power source operation stop condition is detected.

19. A non-transitory computer readable medium storing instructions which upon execution by a computer performs a method of controlling a drive power source of a vehicle with power supply from a battery mounted on the vehicle, the method comprising:
  automatically stopping the drive power source as a result of a predetermined shutdown condition being determined, which includes that a shift position of a transmission of a vehicle is neutral or parking, the drive power source being operative in other than the predetermined condition;
  receiving a signal indicating detection that the drive power source has been automatically stopped as a result of the predetermined shutdown condition; and
  stopping the power supply from the battery under a predetermined power supply stop condition after detection of the stop of the drive power source.

20. The non-transitory computer readable medium as in claim 19, wherein the method further comprises:
  counting an elapsed time period after the detection of the stop of the drive power source,
  wherein the power supply from the battery is stopped when the elapsed time period which has been counted reaches a first time period.

21. The non-transitory computer readable medium as in claim 19, wherein:
  the predetermined shutdown condition further includes that a vehicle travel speed is lower than a predetermined travel speed, a rotation speed of the drive power source is stable at a predetermined rotation speed, and the shift position, the vehicle travel speed and stable operation of the drive power source continue for more than a predetermined time period.

* * * * *